United States Patent [19]

Ruse

[11] 4,037,676
[45] July 26, 1977

[54] POWERED INVALID-CHAIRS

[76] Inventor: Edward Thipthorp Ruse, 304 Bournemouth Park Road, Southend-on-Sea, England

[21] Appl. No.: 598,640

[22] Filed: July 24, 1975

[30] Foreign Application Priority Data

July 24, 1974 United Kingdom ............... 32776/74
Oct. 16, 1974 United Kingdom ............... 44903/74

[51] Int. Cl.² ........................................... B62D 11/04
[52] U.S. Cl. ............................... 180/6.5; 180/DIG. 3
[58] Field of Search ............. 180/6.5, 74, 65 F, 65 E, 180/44 E, 64 M, 64 MM, DIG. 3

[56] References Cited

U.S. PATENT DOCUMENTS

| 2,798,565 | 7/1957 | Rosenthal | 180/64 MM |
| 3,064,744 | 11/1962 | Jennings | 180/6.5 |
| 3,376,944 | 4/1968 | Lotz | 180/6.5 |
| 3,786,887 | 1/1974 | Rosenthal | 180/74 X |
| 3,878,910 | 4/1975 | Walker | 180/33 D |

FOREIGN PATENT DOCUMENTS 867,489 11/1941 France ....................... 180/33 D Primary Examiner—Joseph F. Peters, Jr.
Assistant Examiner—R. Schrecengost
Attorney, Agent, or Firm—Spencer & Kaye

[57] ABSTRACT

A wheelchair for an invalid has two large ground wheels and two castor wheels, each ground wheel being driven by a small electric motor through a drive arrangement in which a driving pulley swings towards a driven surface on the wheel and drives itself into engagement with the driving surface. First control means for the motors and the pulleys are provided for operation by an attendant, and second control means are provided for operation by the invalid. One of the castor wheels is lockable in a straight-ahead position to improve the dirigibility of the wheel chair.

9 Claims, 10 Drawing Figures

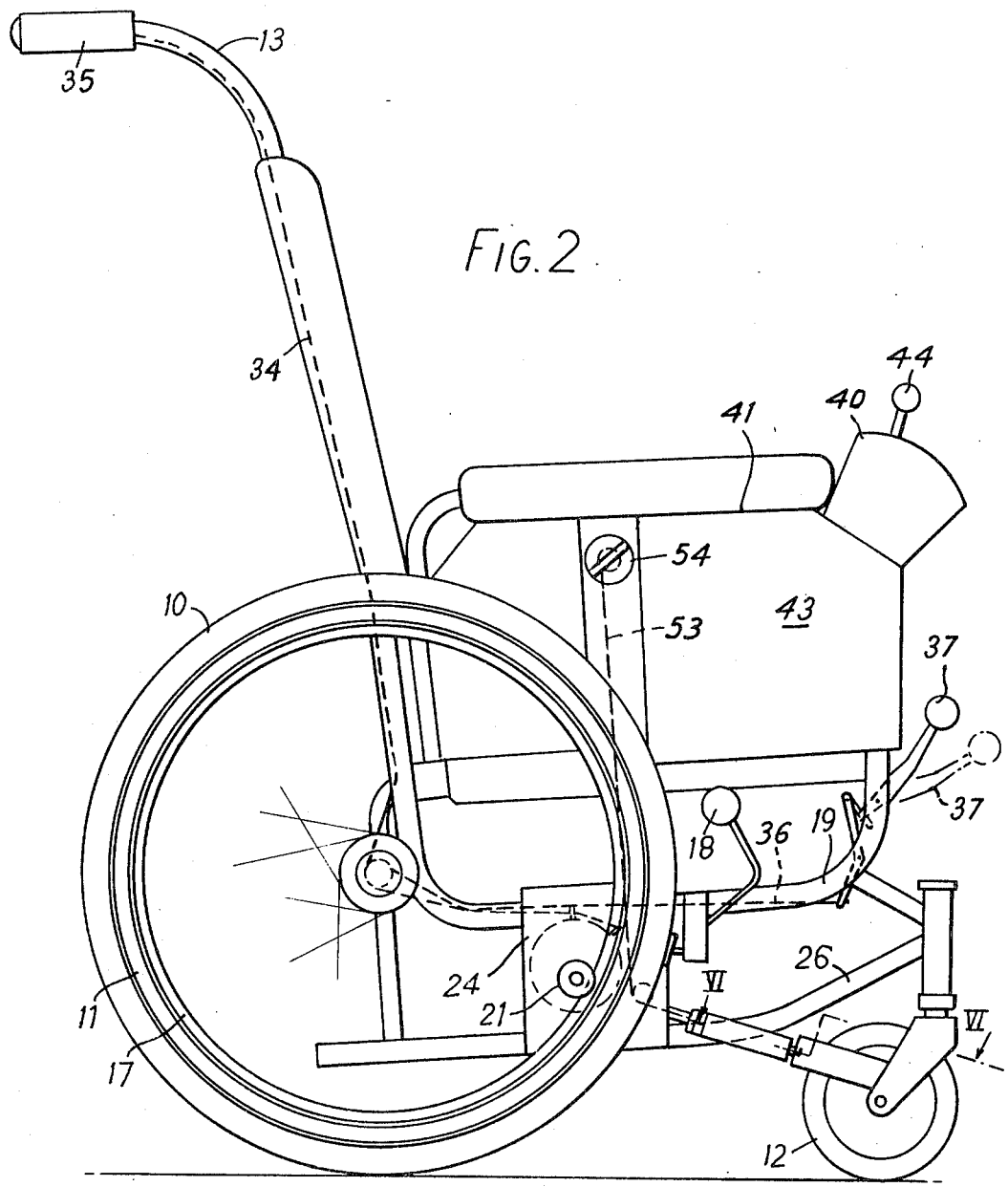
Fig.2
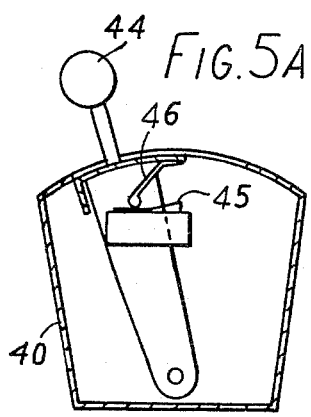
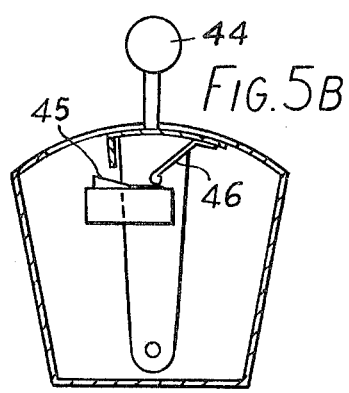
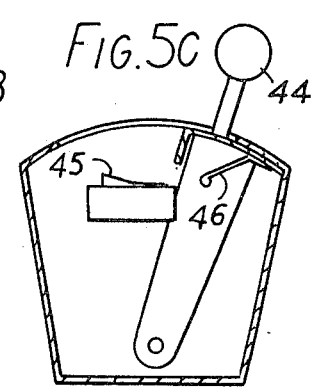

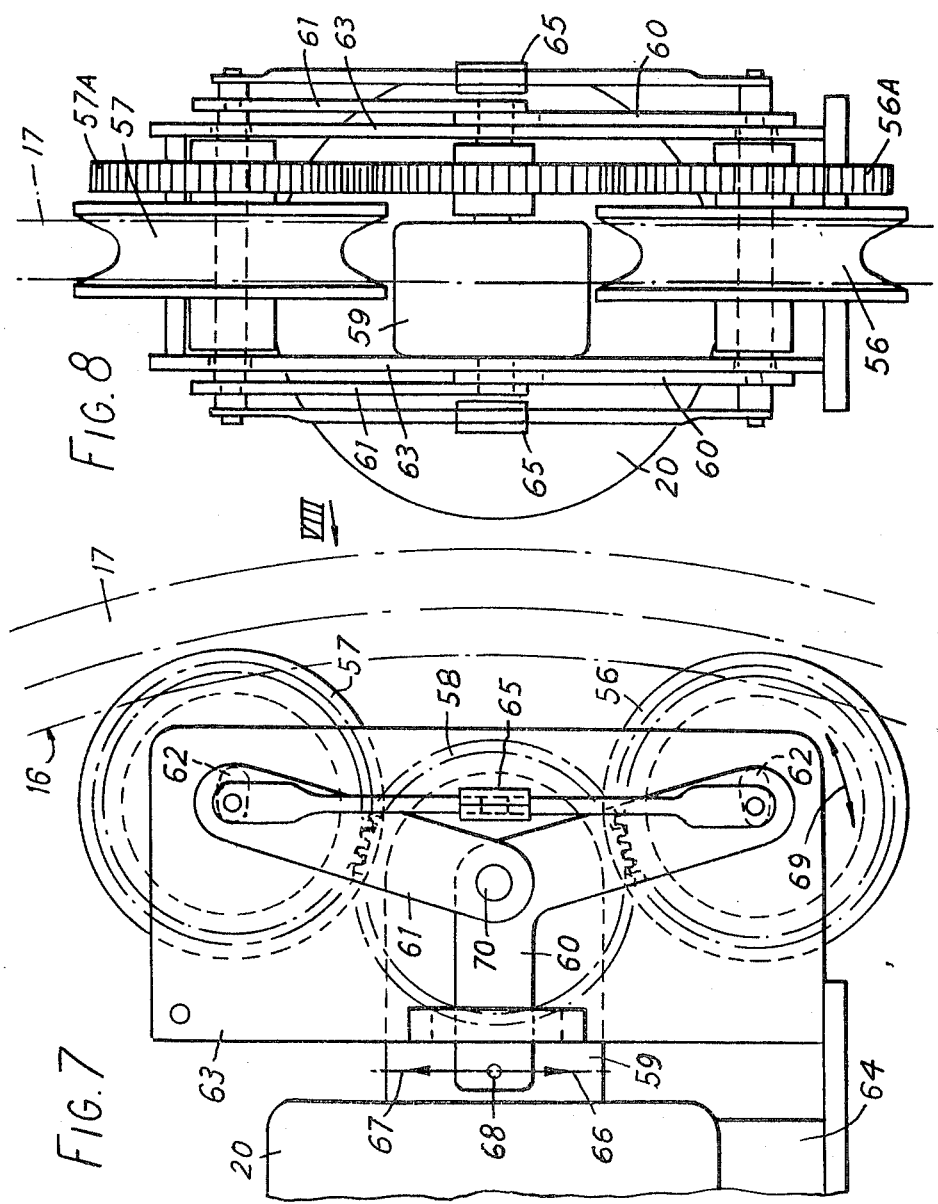

4,037,676

POWERED INVALID-CHAIRS

BACKGROUND OF THE INVENTION

This invention relates to powered wheelchairs for invalids.

Manually-driven wheelchairs, including collapsible chairs, for invalids, have been well-known for many years and electrically-driven chairs have also been produced. However, known electrically-driven chairs have the disadvantages of being expensive and being relatively heavy and difficult to handle when not in use. When small-sized electric motors are employed, difficulty may also be encountered in maintaining engagement between driving pulleys and driven inner surfaces of the relatively large ground wheels, and it is an object of the invention to minimise this difficulty.

It is another object of the present invention to minimise the above-mentioned difficulty of handling.

Yet a further difficulty encountered with power-assisted chairs having castor-type idler wheels, is that steering may be imprecise, and it is a further object of the invention to improve the degree of precision in steering.

SUMMARY OF THE INVENTION

In accordance with the present invention, there is provided a drive arrangement between an electric motor and a relatively large wheel having a driven inner surface, in which a pulley driven by the motor on an axis parallel to the axis of rotation of said wheel is arranged to swing into and out of engagement with said inner driven surface, with the driving surface of the pulley following an arc which cuts the driven surface of the wheel at an acute angle so that the driving pulley swings towards the wheel in the direction opposed to the direction of movement of the driven surface.

Further in accordance with the present invention, there is provided an invalid's wheelchair having two ground wheels each of which is driven by an electric motor through a drive arrangement as defined above, in which control means for said drive arrangement comprise first manually-operable means arranged to swing the pulleys into and out of engagement with the driven surfaces of the wheels, first electric switch means arranged to close when said pulleys are in engagement with the driven surfaces and to open when the pulleys are out of engagement with the driven surfaces, second manually-operable means arranged to be operated by an attendant to swing the pulleys into and out of engagement with the driven surfaces, and second switch means connected in series with said first switch means and arranged to be operated by the invalid to energise the two electric motors when said pulleys are in engagement with the driven surfaces, said second switch means being held closed when said second means are to be operated by the attendant.

In accordance with a further feature of the present invention, means are provided for locking at least one of the castor wheels in the "straight-ahead" position.

Other objects and advantages of the invention will become apparent from the following description of preferred embodiments.

BRIEF DESCRIPTION OF THE DRAWINGS

FIG. 2 is a side view corresponding to FIG. 1;

FIGS. 5A, 5B and 5C are detail views showing alternative positions of a control lever;

FIG. 7 is a detail view illustrating a reversible drive arrangement; and,

FIG. 8 is a view in the direction of arrow VIII in FIG. 7.

DESCRIPTION OF PREFERRED EMBODIMENTS

Figure 1:
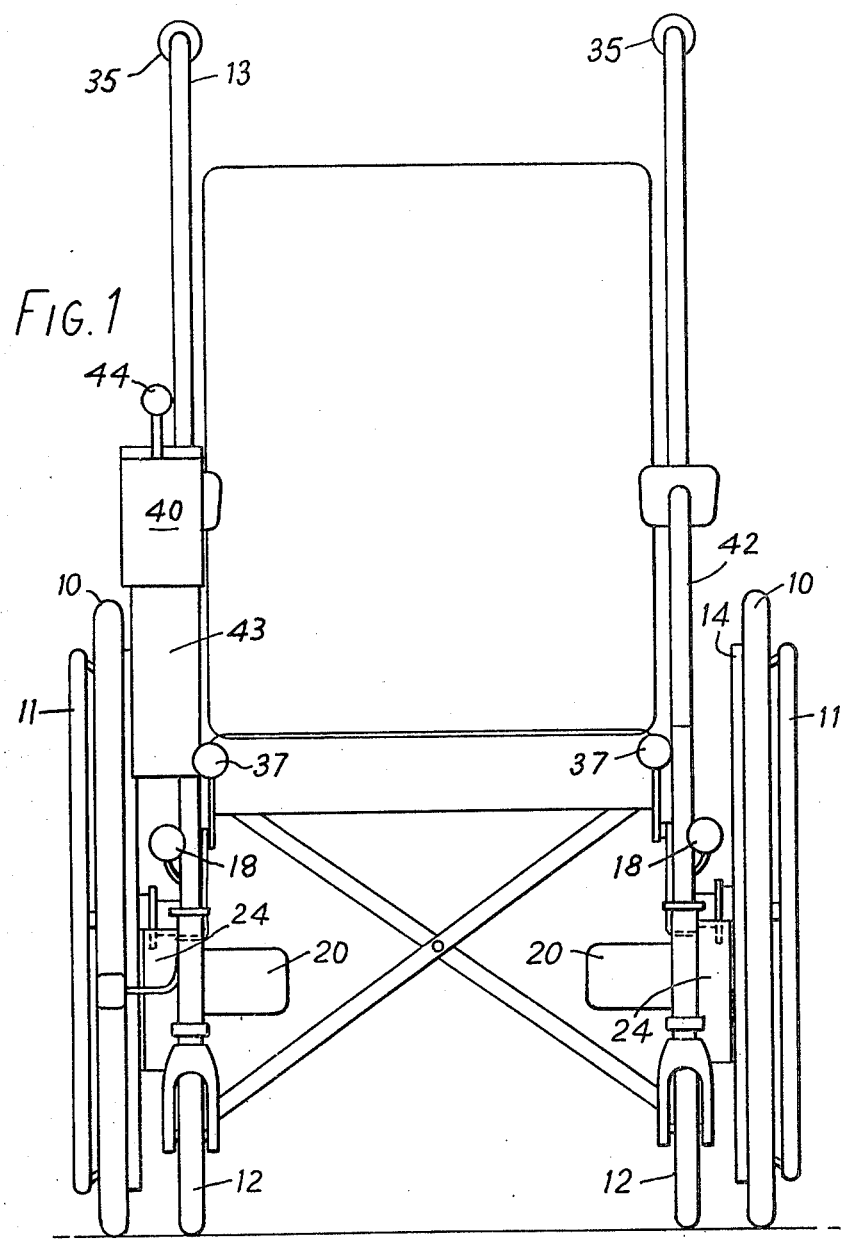
FIG. 1 is a front view of an invalid's wheelchair in accordance with the invention.

Referring to the drawings, the collapsible wheelchair has two large rubber-tyred wheels 10 arranged to be turned by the invalid who may grip hand-rims 11. The chair is of a standard collapsible, form, having smaller front castor wheels 12 and rearwardly-extending handles 13 for use by an attendant.

Figure 4:
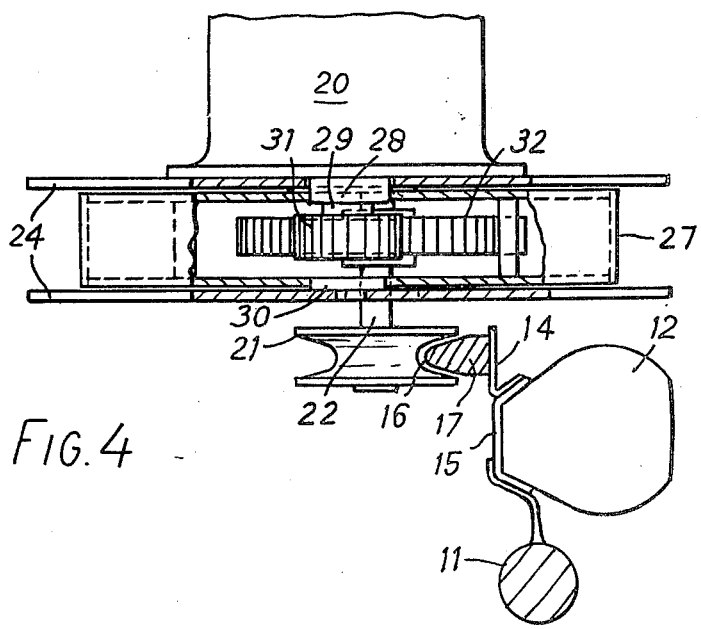
FIG. 4 is a detail section on the line IV—IV of FIG. 3.

Each chair wheel 10 is provided at its inner side with a circular rim member 14 welded to tyre-carrying rim 15, and the rim member is provided on its inner face with a friction surface 16. As shown in FIG. 4, the surface is provided by a length of V-belting 17 secured by adhesive around the inner face of the rim member 14.

Hand-brakes 18 of standard form are mounted on tubular frame members 19 to engage the tyres of wheels 10.

Figure 3:
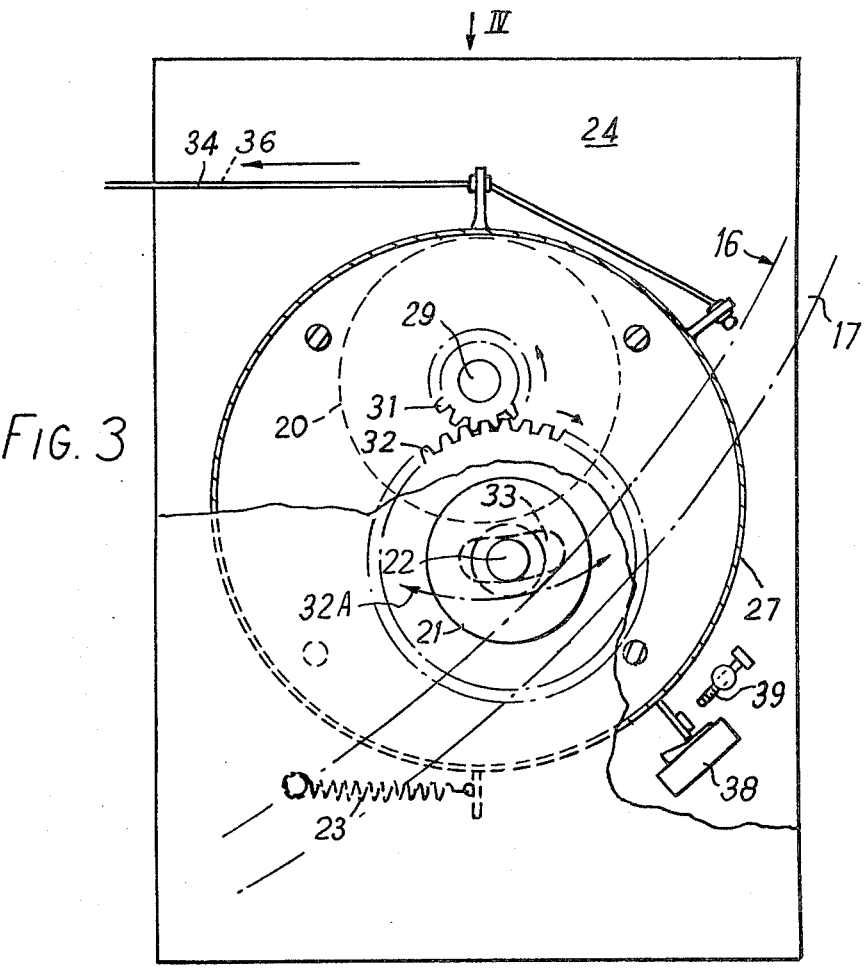
FIG. 3 is a detail view showing the gearbox drive from an electric motor to a driven pulley.

A small electric motor 20 is mounted adjacent each chair wheel 10 with the axis of the aligned motors parallel to the axis of the chair wheels. Referring to FIG. 3, each electric motor drives a V-pulley 21 which is mounted on a swing shaft 22 to be moved, against the action of return spring 23, into driving engagement with the V-belting 17 at the leading part of the wheel 10. Each motor 20 is carried on the inner plate of a pair of side plates 24 secured to tubular members 19 and 26 of the chair frame. A circular gear box 27 is pivotally mounted bwetween the plates 24 on a bush 28 around motor shaft 20 and a journal member 30 mounted in the outer plates 24. In the box, a pinion 31 on the motor shaft 29 drives pinion 32 mounted on the swing shaft 22 which extends through arcuate slots 33 in the plates 24. It will be noted that the electric motors 20 and the pulleys 21 are located below the level of the wheel axis, so that the driving surfaces of the pulleys swing about shafts 28 along arcs 32A which cut the driven suface 16 and the pulleys "drive into" the V-belting 17.

A first pair of cables 34 is provided to swing the pulleys 21 into driving engagement with the surfaces 16, against the action of springs 23, and hold the pulleys in engaged or disengaged positions. The cables 34 are controlled by twist-grips 35 mounted on the chair handles 13, for operation by an attendant. A second pair of cables 36 is arranged to be operated by two-position levers 37 to perform the same function of swinging the pulleys 21 into their driving positions. Each lever 37 is movable between an engaged position as shown in broken lines in the drawings, and a disengaged position as shown in full lines.

An electric rocker switch 38 is mounted on a plate 24 adjacent each gear box 27 to be closed when the pulleys 21 are moved to their engaged positions. An adjustable stop 39 is provided to limit the pivotal movement of each gear box 27, ad thus each pulley 21, and adjusters (not shown) may be provided to adjust the cables relative to each other and to the switches 38.

An invalid-operated hand control box 40 is mounted on right-hand arm rest 41 of the chair, the left-hand arm-rest 42 remaining free for removal to improve access to the chair, and a rechargeable electric battery is carried in a compartment 43 below the control box. The control box 40 has a lever 44 which is movable between three positions as shown in FIGS. 5A, 5B and 5C, and has a pair of rocker switches 45 which are in circuit with switches 38. The three positions of lever 44 will now be described with reference to FIGS. 5A to 5C of the drawing.

5A - Lever 44 back - Rocker switches 45 are closed by spring arms 46. In this position the levers 37 should be up, i.e. disengaged, and the pulleys 21 are swung into engagement and the switches 38 closed to energise the motors by an attendant operating the twist grips 35.

5B - Lever 44 central - Rocker switches 45 are urged by spring arms 46 towards their open positions to be operated by an invalid closing the rocker switches. The levers 37 should be down, i.e. engaged.

5C - Lever 44 forward - Rocker switches 45 are free to be moved by an invalid between open and closed positions which they hold until moved again. The levers 37 should again be down, i.e. engaged.

Thus, with the lever 44 in position 5A the chair is completely controlled by an attendant caring for a severely handicapped invalid. In position 5B, the control is by an invalid having hand movements which are subject to failure, e.g. in a seizure and in such an event the switches 45 should return to their open positions. In position 5C, the chair can be controlled by a patient whose hand movements are reliable. Steering can be effected by appropriate energising of the right-hand and left-hand motors, and it has been found that manoeuvring in limited spaces can be achieved particularly easily, with the 5B lever position.

Figure 6:
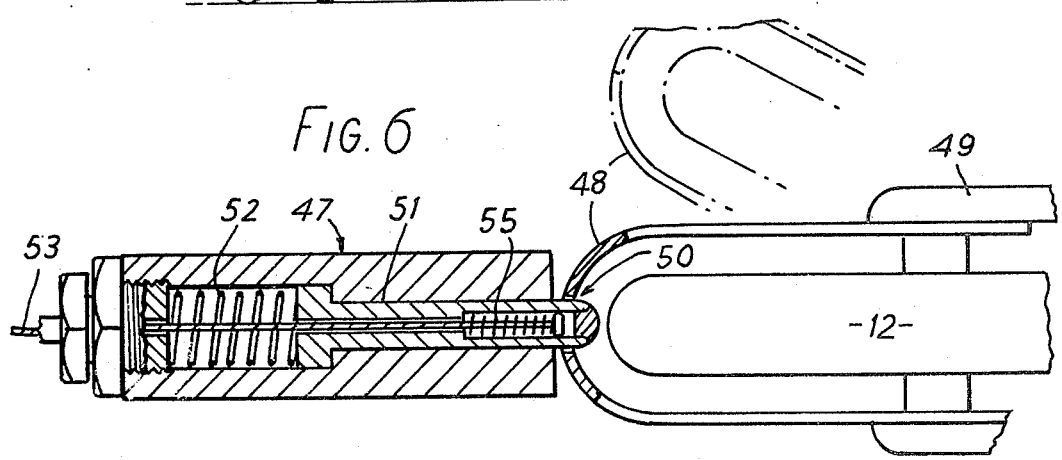
FIG. 6 is a detailed section on the line VI—VI of FIG. 2.

As shown in FIGS. 2 and 6, the right-hand castor wheel 12 may be locked in the "straight-ahead" position by means of a plunger device 47. A U-shaped bracket 48 is secured to castor wheel fork 49 and is formed with a rear opening 50. When plunger 51 is urged forward by spring 52, it will enter the opening 50 to lock the wheel 12, and the plunger may be retracted by cable 53 to free the wheel. The cable is operated by means of a two position knob 54 mounted on the compartment 43 and, to minimise the danger of cable breakage, the cable is connected to the plunger 51 through a supplementary spring 55. If, when the knob 54 is rotated, the plunger is being frictionally held by the bracket 48 due to the chair turning, the spring 55 will be compressed and will retract the plunger when the grip of the bracket is released.

The power drive described above can be provided inexpensively and gives power assistance, for example in moving the chair up a ramp or other incline. It is intended that the battery size is relatively small, e.g. 10 amp hours, but this has proved to be adequate for considerable periods of time if the power is used as assistance rather than continuously.

It is also envisaged that the features of the invention described may have application other than in invalid wheelchairs, for example in a child's tricycle which may have a rearwardly extending arm for control by an adult, and the method of "driving-in" of the pulleys 21 may be applied to semi-automatic power assistance, for example in bicycles where assistance is required when starting or moving uphill. Then, the pulley can be manually moved into powered engagement with a road wheel where it is held by its driving-in action, and arranged to be deenergised when the pulley starts to be driven by and thus away from the road wheel.

In these various drive arrangements, the angle at which the driving pulley arc 32A cuts the driven surface 16 is determined by trial and depends on, for example, the dimensional layout, and the compressibility of the V-belting 17. However, the angle should be acute and sufficiently small to produce a degree of wedging effect, but not so acute as to cause jamming of the pulley or to require a very powerful return spring 23.

Modifications may be made without departing from the scope of the invention. For example, provision may be made for reversing the drive. In this case motor controllers are provided with forward, off, and reverse, positions, and the driving pulleys 21 are positioned appropriately to avoid driving out or disengaging from the V-belts secured to the rim members on the driven chair wheels. In one such arrangement which is illustrated in FIGS. 7 and 8, two grooved driving pulleys 56, 57 have pinions 56A and 57A and are rotated, in the same direction, by a pinion 58 which is driven by the motor 20 through a worm-drive gear device 59. The lower pulley 56 is carried at the outer ends of a pair of angled levers 60, and the upper pulley 57 is carried at the outer ends of a pair of links 61 pivotally mounted on the levers 60. The pulley shafts are slidable along slots 62 in a pair of fixed plates 63 carried by motor frame 64, and the distance between the shafts may be adjustable by means of turnbuckles 65. In use, the angled levers 60 are pivoted upwardly or downwardly from their mid or off position where both pulleys are just out of contact with the V-belt 17, by means of, for example, cables 66 and 67 connected to eyes 68 in levers 60. When the levers are pivoted upwardly, under the action of cable 66, the lower pulley 56 swings about an arc 69 centred on pivotal axis 70 of the levers, into engagement with the V-belt, and the motor is energised by the lever movement to rotate the pinion 58 anticlockwise and thus drive the lower pulley and the chair wheel clockwise. As the lower pulley rotates, it tends to swing about the aforementioned arc and drive into the V-belt. In this position, the upper pulley 57 moves further out of contact with the V-belt. To drive the chair wheels in the opposite direction the angled levers 60 are pivoted downwardly to bring the upper pulley 57 into contact with the V-belt and to energise the motor to drive in the opposite sense.

In this construction virtually all the strain which is imposed on the drive system is taken by the sub-frame of the motor.

In a further modification, the rim member 14 may be located at or near the wheel hub and a powered hub may thus be provided.

I claim:

1. An invalid wheelchair comprising a frame, two relatively large ground wheels mounted on the frame and having a common axis of rotation, and at least one further ground wheel mounted on the frame, an electric motor mounted adjacent to each of said relatively large ground wheels, and a drive arrangement between each of said electric motors and its adjacent ground wheel, each drive arrangement comprising a pulley which is driven by the motor to rotate on an axis parallel to the axis of rotation of said relatively large ground wheel and which has a driving surface, the pulley being adapted to swing into and out of engagement with said inner driven surface with the driving surface of the pulley following an arc which cuts the driven surface of the wheel at an acute angle so that the driving pulley swings towards the wheel in the direction opposed to the direction of movement of the driven surface and drives itself into engagement with the driven surface, control means for said drive arrangement, in which said control means include first manually-operable means to swing said pulleys into and out of engagement with the driven surfaces of the wheels, first electric switch means to close when said pulleys are in engagement with the driven surfaces and to open when said pulleys are out of engagement with the driven surfaces, second manually-operable means which are operated by an attendant to swing said pulleys into and out of engagement with the driven surfaces, and second switch means connected in series with said first switch means and operated by the invalid to energise the two electric motors when said pulleys are in engagement with the driven surfaces, said second switch means being held closed when said second means are to be operated by the attendant.

2. A wheelchair according to claim 1, in which each of said ground wheels has a tyre-carrying rim, a rim member having an inner face is secured to each of said tyre-carrying rims, and each of said inner surfaces comprises a length of V-belting secured around said inner face of the rim member.

3. A wheelchair according to claim 1, in which said motors are adapted to automatically deenergise when the speed of said driven wheels increases to urge said driving pulleys out of engagement.

4. A wheelchair according to claim 1, in which said second switch means comprise a pair of rocker switches which respectively control the two electric motors.

5. A wheelchair according to claim 4, in which said second switch means comprise a lever which moves between a first position in which said rocker switches are held closed, a second position in which said rocker switches are urged to open positions, and a third position in which said rocker switches are free to move between the open and closed positions.

6. A wheelchair according to claim 1, and further comprising at least one castor wheel, in which means are provided to lock said castor wheel in a straight-ahead position.

7. A wheelchair according to claim 6, in which a pivotal fork carries said castor wheel, and said locking means comprise a member extending rearwardly from said fork and a plunger device adapted to engage said member to hold the castor wheel in the straight-ahead position.

8. A wheelchair according to claim 7, in which said plunger device comprises a plunger, a first spring which urges said plunger into engagement, a cable to retract said plunger, and a second spring connected between the cable and the plunger, said second spring compressing on retraction of the cable when said plunger is locked and expanding against said first spring to retract the plunger when the plunger becomes free.

9. A wheelchair according to claim 1, in which each of said electric motor drives is reversible, and twin pulleys which swing about individual arcs are provided to ensure driving engagement with said driven surfaces in either driving direction.

* * * * *